United States Patent

[11] 3,571,844

[72] Inventor Philip G. Stiles
   Davis, Calif.
[21] Appl. No. 734,455
[22] Filed June 4, 1968
[45] Patented Mar. 23, 1971
[73] Assignee The University of Connecticut
   Storrs, Conn.

[54] POULTRY CONVEYOR SYSTEM
   7 Claims, 5 Drawing Figs.
[52] U.S. Cl. .................................................. 17/11,
   17/44.1
[51] Int. Cl. ................................................. A22c 21/00
[50] Field of Search ........................................ 17/11, 24,
   44.1; 198/127

[56] References Cited
   UNITED STATES PATENTS
   961,338  6/1910  Bright ........................... 17/24
   1,019,086  3/1912  Quinn ........................... 17/44.1UX
   2,658,236  11/1953  Altenpohl ..................... 17/44.1
   3,127,003  3/1964  Goepper et al. ................ 198/127

FOREIGN PATENTS
   22,389  5/1960  Germany ..................... 17/24

Primary Examiner—Lucie H. Laudenslager
Attorney—McCormick, Paulding & Huber

ABSTRACT: A continuous conveyor of linked steel plates has a plurality of shackles provided thereon for normally advancing with the conveyor, and each shackle has three gripping units for selectively holding either the two legs of a poultry carcass and/or the neck portion thereof. A gate at one side of the conveyor can be swung inwardly to restrain those shackles upstream thereof. Two shackle constructions are disclosed, the gripping unit of one construction having pivotally mounted jaws which are open or closed in response to lateral sliding movement of a control bar or camming trigger. The other gripping unit construction has spring fingers for gripping the extremities of the poultry carcass in response to lateral pivotal movement of a bellcrank. One leg of the bellcrank carries the spring fingers, and the other leg of the bellcrank comprises an upstanding control bar adapted to be pivoted laterally when engaged by an overhead guide bar provided for this purpose.

PATENTED MAR 23 1971

INVENTOR.
PHILIP G. STILES
BY
McCormick, Paulding & Huber
ATTORNEYS

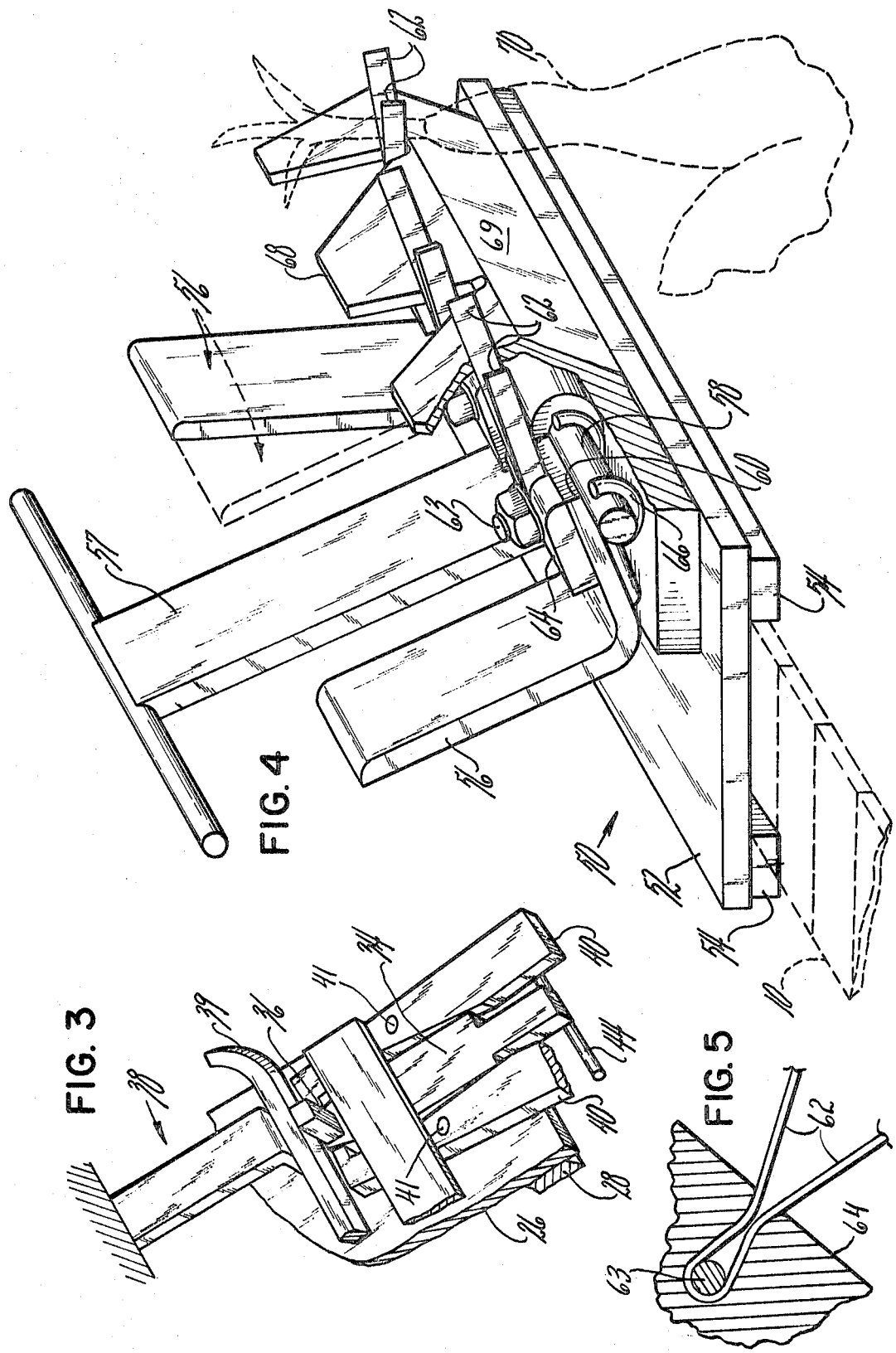

POULTRY CONVEYOR SYSTEM

SUMMARY OF INVENTION

This invention relates to poultry conveyor systems, and deals more particularly with a conveyor system wherein each poultry carcass can be moved independently of adjacent carcasses on a conveyor line.

Commercial poultry-processing plants generally include a moving conveyor line which has a plurality of shackles carried by the conveyor so that each shackle is connected to a preceding shackle and a following shackle. All shackles move at the same speed as the conveyor line to which they are attached. Although a carcass may be momentarily delayed, no single shackle or group of shackles can be stopped without stopping the powered conveyor itself. Thus, every worker in the plant, and every machine as well, must perform its function at the speed of the conveyor line. Due to the irregularity in poultry carcass sizes the above-mentioned circumstances have inhibited the development of machines for automatically performing many of the processing tasks. This result can be attributed to the necessity for such machines to be synchronized with respect to the powered conveyor.

Accordingly, a general object of the present invention is to provide a poultry conveyor system in which the various shackles can be moved either in synchronism with each other and with the powered conveyor line, or can be delayed or stopped independently of one another in a relatively unsynchronized manner.

A further object of the present invention is to provide an improved shackle construction which permits poultry carcasses to be more rapidly loaded and unloaded onto a continuously operated conveyor.

A still further object of the present invention is to provide an improved shackle construction wherein the poultry carcasses can be readily fed onto each shackle so as to be supported either by the legs or by the neck portion of the carcass, which shackle construction also permits the poultry carcasses to be removed automatically at a predetermined station along the conveyor line in a positive manner so as not to require the attention of a workman and hence divert him from his regular work in the production line.

Still another object of the present invention is to provide an improved shackle construction which is especially useful with a continuously operating conveyor, the shackles being capable of sliding movement with respect to the conveyor so as to be slowed or stopped with respect thereto without any tendency to interlock with one another, and which slowing or stopping can be accomplished by the use of a relatively simple gate device.

A still further object of the present invention is to provide an improved shackle construction wherein three separate gripping units are provided on each shackle for independently gripping either the leg portions of the carcass or the neck portion thereof, which gripping units operate automatically and independently from one another so that the poultry carcass can be suspended by both the legs and the neck portion to facilitate the dressing operation wherein an incision must be made in the carcass, said shackle being so constructed as to permit independent releasing of the neck portion of the carcass prior to performing a further processing step in the production line.

BRIEF DESCRIPTION OF THE DRAWINGS

FIG. 3 is a detailed view of a portion of the shackle shown in FIG. 2 with suitable guide means for actuation of the control bar or trigger associated with one or more of the gripping units thereof.

FIG. 4 is a perspective view of a second embodiment of shackle for use on a conveyor of the type shown in FIG. 1, with a portion of one poultry carcass being shown in broken lines.

FIG. 5 is a generally horizontal sectional view of a portion of the shackle shown in FIG. 4.

DETAILED DESCRIPTION

Figure 1:
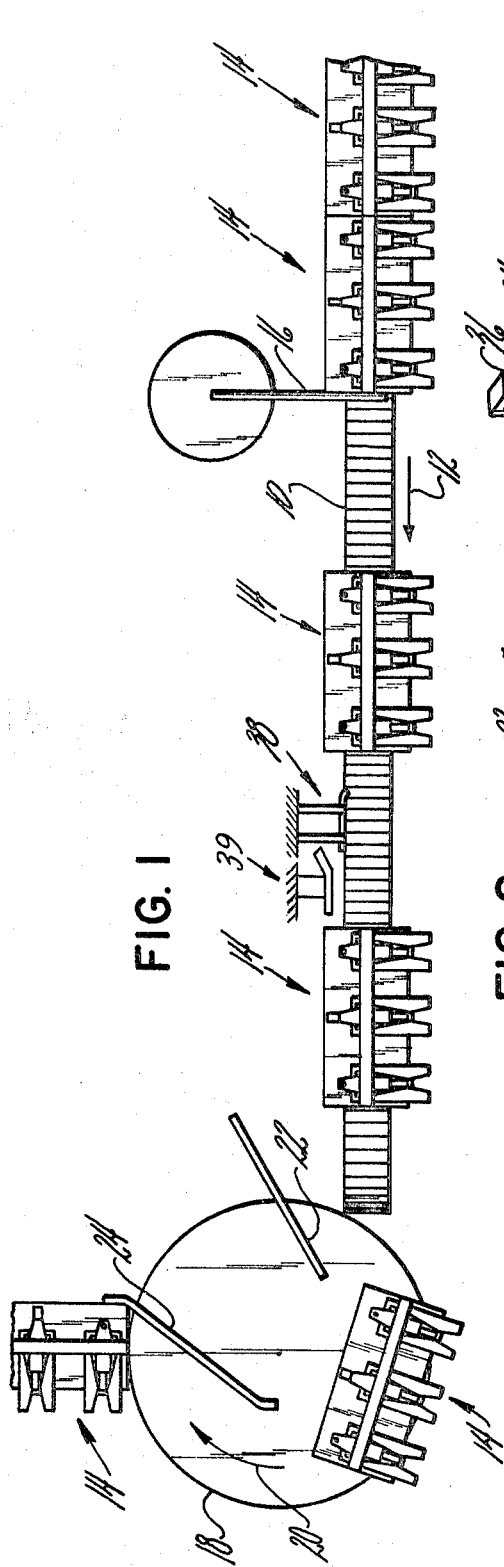
FIG. 1 is an overall plan view of a conveyor system incorporating the present invention, a plurality of shackles being arranged on one continuous steel-plate-type conveyor, and means being shown for transferring the shackles from this conveyor to a succeeding conveyor of the same type arranged at an angle to the first conveyor.

Turning now to the drawings in greater detail, FIG. 1 shows the upper run 10 of an endless conveyor comprising a plurality of steel plates linked together by conventional means and driven in the direction of the arrow 12. While a steel-plate-type conveyor is shown in the drawings, it will be understood that any endless conveyor construction might be adapted for use in accordance with the present invention, as for example a belt-type conveyor.

A plurality of shackles 14, 14 are provided on the conveyor 10 and these shackles are adapted to be continuously advanced in the direction of the arrow 12 except when restrained by suitable means, as for example the rotating gate device 16 which is restraining the downstream shackles 14, 14 so that a workman can mount a poultry carcass thereon in a manner to be described in greater detail hereinbelow. A rotating turn table 18 is provided at the downstream end of the conveyor 10 and is continuously driven in the direction of the arrow 20. A fixed guide 22 is provided adjacent the downstream end of the conveyor 10 so as to urge the shackle 14 onto the periphery of the rotating turntable 18, and a second guide 24 is provided as shown so as to urge the shackles off the turntable 18 onto a second conveyor arranged at an angle to the first conveyor for transporting the poultry carcasses to an area of the plant for further processing.

Figure 2:
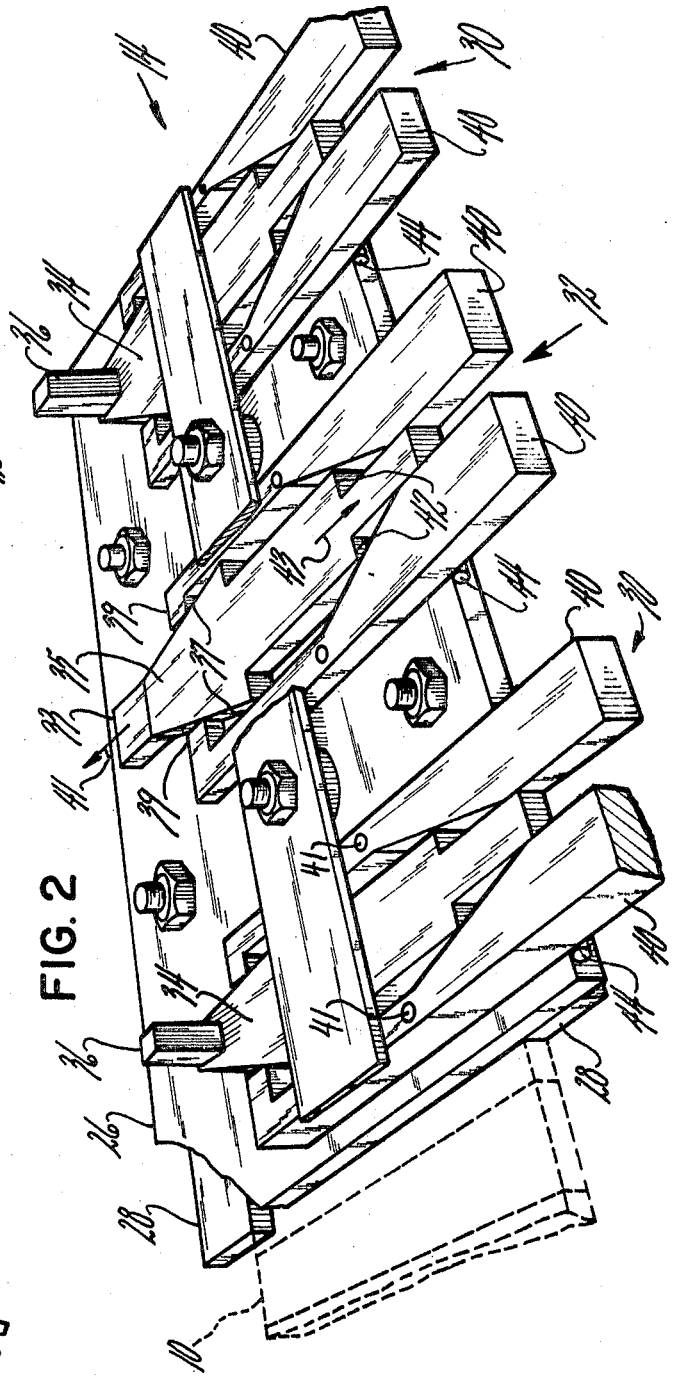
FIG. 2 is a detailed perspective view of one shackle of the type shown in FIG. 1, with portions thereof being broken away to reveal its various parts.

Considering next the construction of the shackle 14 in greater detail, FIG. 2 shows such a shackle with portions broken away to reveal its individual parts. The conveyor is shown in broken lines at 10, and the shackle 14 comprises a generally horizontally extending base portion or plate 26 to which guide bars 28, 28 are mounted on the underside of said base 26 for guiding the shackle 14 as it is advanced with the conveyor 10. It will be apparent that when the gate device 16 is rotated into the active position shown in FIG. 1, the shackle 14 will be stopped and the conveyor 10 will continue to move therebeneath providing a nonsynchronized conveyor line for the poultry carcasses. The shackle 14 includes three separate gripping units 30, 30 and 32 for releasably clamping one or more extremities of the poultry carcass for movement of the carcass alongside the conveyor 10. Preferably, the shackle 14 is heavy enough so that the poultry carcasses being transported will not tend to overturn the shackle 14. If desired, the upper run of the conveyor 10 might be inclined slightly with respect to the horizontal so as to further reduce any toppling effect of the carcass, or to change the orientation of the carcass for a particular processing operation in a particular plant. It is an important feature of the present invention that three such gripping units are provided on each shackle, and preferably the center-gripping unit 32 is provided to grip the neck portion of the carcass, whereas the fore-and aft-gripping units 30, 30 are adapted to grip the leg portions of the carcass. As will be seen from the description to follow, each of these gripping units is independently operable and by arranging one conveyor above another it is possible to transfer the carcasses from one conveyor to another merely by stopping both shackles on the conveyors and by utilizing the individual gripping units 30, 30 and 32, on first one and then the subadjacent conveyor respectively.

Still with reference to FIG. 2, the gripping units 30, 30 preferably include a control bar or camming device 34 which is mounted for limited lateral movement with respect to the direction of movement of the conveyor 10. These control bars 34, 34 have upstanding portions 36, 36 which can be engaged by an overhead guide device 38, best shown in FIGS. 1 and 3, so as to operate the control bar at a particular location along the conveyor. As best shown in FIG. 3, the upstream end of the guide device 38 comprises a laterally outwardly curved portion 39 for engagement with the upstanding posts 36, 36 on the gripping units 30, 30. The control bar 35 associated with the center-gripping unit 32 has a rearwardly extending portion 33 for engagement by a similar type of guide 39 to permit independent operation of the gripping units 30, 30 and 32.

The gripping units 30, 30 and 32 further include gripping jaws 40, 40 which are pivotally mounted as indicated by the pivot pins 41, 41 to the base plate 26 and arranged on either side of the slidable control bars 34 and 35 respectively so as to be cammed by the latter into and out of engagement with an extremity of the poultry carcass to be transported. Thus, the control bar 34 comprises a camming device slidably supported in the base between the jaws 40, 40 for urging the latter toward one another in response to movement in one lateral direction and urging the jaws apart when moved in the opposite lateral direction. The control bar 35 associated with the gripping unit 32 is identical to the bars 34, 34 except for the portion 33 which has been described above. Both bars 34 and 35 have shoulders 37, 37 for engagement with inwardly protruding fingers 39, 39 of the jaws 40, 40 to cam the jaws closed in response to lateral movement of the bar in the direction of the arrow 41. The control bars 34 and 35 also have a second pair of shoulders 42, 42 adapted to cam the jaws 40, 40 apart in response to lateral movement of the control bar in a forward direction indicated by the arrow 43.

With further reference to the control bars 34, 34 and 35, associated with the gripping units 30, 30 and 32 respectively, each of these control bars preferably includes a forward end portion which carries a crossbar 44 for pushing the carcass extremity laterally outwardly away from the jaws 40, 40 in response to movement of the control bar in the direction indicated by the arrow 43.

FIG. 4 shows a shackle 50 of alternative construction also adapted for movement with a steel-plate-type conveyor 10, or adapted for sliding movement with respect to the moving conveyor 10 as for example when the shackle is restrained by a gate device of the type described hereinabove at 16 with reference to FIG. 1. The shackle 50 also includes a generally horizontally extending base plate 52, the underside of which carries guide bars 54, 54 to assure that the shackle 50 does not move laterally with respect to the advancing conveyor 10. In the shackle construction shown in FIG. 4, the control bar for the fore- and aft-gripping unit comprises one arm 56 of a bellcrank lever, which lever is pivotally supported in the base 52 for limited lateral pivoting movement about an axis defined by the rockshaft 58, which shaft is aligned with the direction of travel of the conveyor 10. Each of the bellcrank levers 56, 56 also includes a second arm 60 to which a pair of spring fingers 62, 62 are mounted by means of a mounting block 64. An upwardly open slot in the block 64 receives the spring fingers 62, 62 and a screw 63 clamps the fingers so that they can be flexed toward and away from one another.

Spring-biasing means 66 is provided on the rockshaft 58 for urging the bellcrank 56 from the solid line position shown for the aft-gripping unit on the shackle 50 toward the broken line position shown. The spring fingers 62, 62 associated with each of the gripping units in the shackle 50 are normally spread apart to receive an extremity of the poultry carcass as shown in the detailed view of the normal or open positions of the fingers 62, 62, and a camming device in the form of the fixed block 68 is provided on the base plate 52 for engaging the spring fingers when the bellcrank lever is pivoted laterally in one direction to close the fingers and grip a carcass extremity therebetween as indicated generally at 70. The block 68 is attached to the base plate 52 and defines three upwardly open V-shaped notches for so urging the spring fingers toward one another in response to lateral pivotal movement of the bellcrank lever 56 and in order to assure positive disengagement between the spring fingers and the extremity of the carcass 70 when the lever is moved in the opposite lateral direction from the solid line position to the broken line position shown in FIG. 4, the V-shaped opening defining portion of the block 68 is provided with an inclined front surface 69 for pushing the carcass laterally outwardly away from the spring fingers 62, 26.

As in the previous embodiment, the center-gripping unit has its control arm of lever 57 slightly different in configuration from the upstanding arm of the fore- and aft-levers 56, 56 in order to permit the gripping unit associated with the neck portion to be operated independently of the units associated with the legs 70, 70 of the poultry carcass.

I claim:

1. An apparatus for conveying poultry on shackles which need not be synchronized with respect to one another, said apparatus comprising a continuous conveyor having an upper run which moves continuously in a downstream direction, a plurality of shackles on said upper conveyor run for frictionally engaging said conveyor to normally move therewith, a gate mounted to one side of said conveyor for selective engagement with one of said shackles to restrain that shackle from movement with said conveyor, each of said shackles comprises a base portion having a lower surface which permits said conveyor to slide thereunder when said shackle is so restrained by said gate, at least one gripping unit mounted to said shackle base and having jaws adapted to grip a poultry carcass so as to support the carcass in a depending position alongside side conveyor, said unit including a control bar movably mounted to said base for limited lateral movement generally perpendicular to said downstream direction, said control bar being connected to said gripping jaws for movement of the jaws into and out of engagement with said carcass in response to lateral movement of said bar in one and an opposite direction respectively.

2. An apparatus according to claim 1 wherein said gripping jaws are pivotally mounted on said shackle base, and wherein said laterally movable control bar comprises a camming device slidably supported in said base between said jaws for urging the jaws toward one another in response to movement in one lateral direction and for urging said jaws apart when moved in the opposite lateral direction.

3. An apparatus according to claim 1 wherein said control bar comprises an upstanding arm of a bellcrank lever pivotally supported in said base for limited lateral pivoting movement about a pivot axis aligned with the direction of travel of said conveyor and shackle, said bellcrank lever including a second arm to which said gripping jaws are mounted, said jaws comprising spring fingers which are normally spread apart to receive an extremity of the poultry carcass, and a camming device on said base for engaging said spring fingers when said bellcrank lever is pivoted laterally in one direction to close said spring fingers and grip a carcass extremity therebetween.

4. An apparatus according to claim 2 wherein said control bar includes a portion adjacent said carcass-engaging jaws for pushing said carcass laterally outwardly as said jaws are opened.

5. An apparatus according to claim 3 wherein said camming device comprises a fixed block on said shackle base, said block having an upstanding portion which defines a V-shaped opening for urging said spring fingers toward one another in response to lateral pivotal movement of said bellcrank lever in said one direction.

6. An apparatus according to claim 5 wherein said upstanding block portion has an outer face which is inclined with respect to said conveyor-engaging base so that pivotal movement of said lever in said opposite direction causes engagement between said poultry carcass and said inclined upstanding portion to push said carcass laterally outwardly away from said spring fingers.

7. An apparatus according to claim 1 and further characterized by guide means above said conveyor upper run for engagement by an upstanding portion of said control bar for selectively releasing the poultry carcass held by said gripping unit.